April 24, 1934.  H. DRAPER  1,956,318
CHUCK
Filed Dec. 2, 1931  2 Sheets-Sheet 1

INVENTOR:
HAROLD DRAPER,
BY *Galen P. ____*
HIS ATTORNEY.

April 24, 1934.  H. DRAPER  1,956,318
CHUCK
Filed Dec. 2, 1931 2 Sheets-Sheet 2
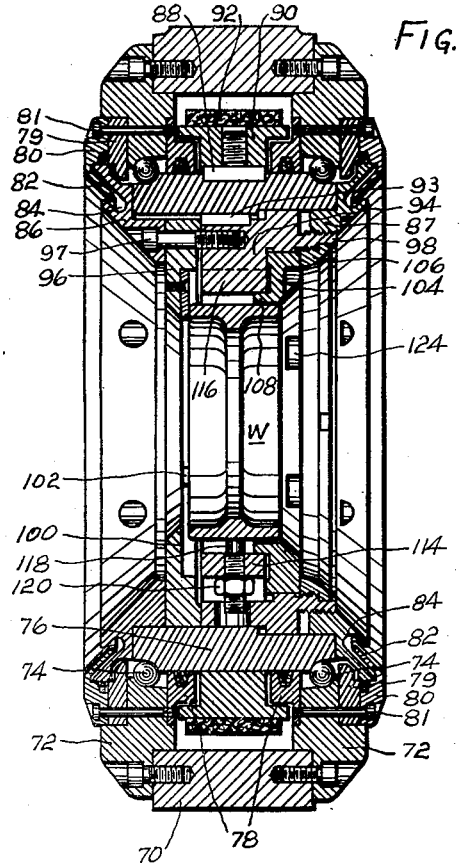
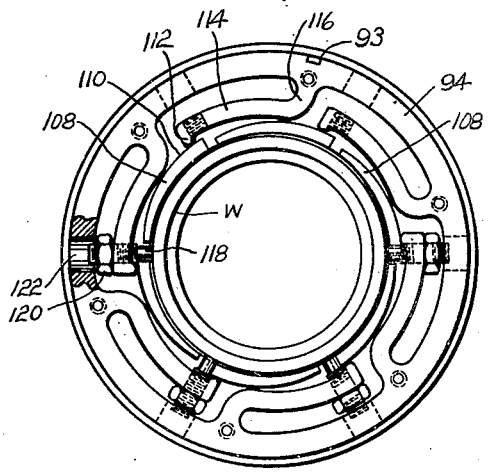
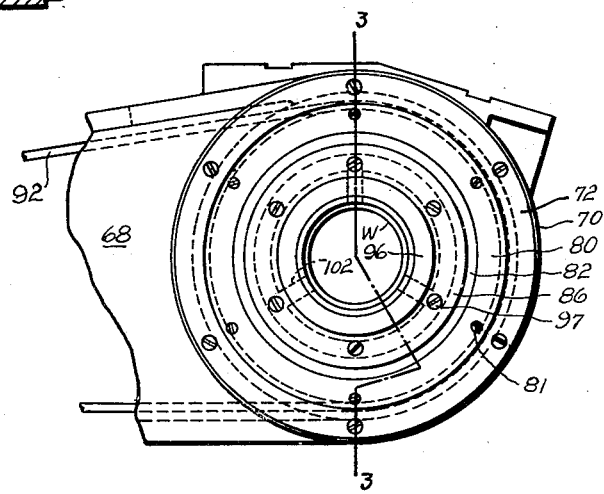
INVENTOR:
HAROLD DRAPER,
BY
HIS ATTORNEY.

Patented Apr. 24, 1934

1,956,318

UNITED STATES PATENT OFFICE 1,956,318

CHUCK

Harold Draper, Bristol, Conn., assignor, by mesne assignments, to General Motors Corporation, Detroit, Mich., a corporation of Delaware Application December 2, 1931, Serial No. 578,477

18 Claims. (Cl. 279—71)

This invention relates to chucks and comprises all of the features of novelty herein disclosed. An object of the invention is to provide a chuck having improved work locating and gripping features. Another object is to provide a simple, reliable and inexpensive chuck and one that has few wearing parts and will not be apt to clog with grit. Still another object is to provide an improved work holder which supports the work with both ends open, as for the internal grinding of a plurality of surfaces by oppositely presented grinding wheels.

To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a sectional view taken through the axis of a chuck and through a portion of its supporting head about on the line 1—1 of Fig. 2.

Fig. 3 is a sectional view, taken about on the line 3—3 of Fig. 5, of a work head and a chuck which support the work with both ends exposed.

Fig. 4 is an end view of the chuck ring and associated parts.

Fig. 5 is an end view of the work head to smaller scale.

Figure 1:
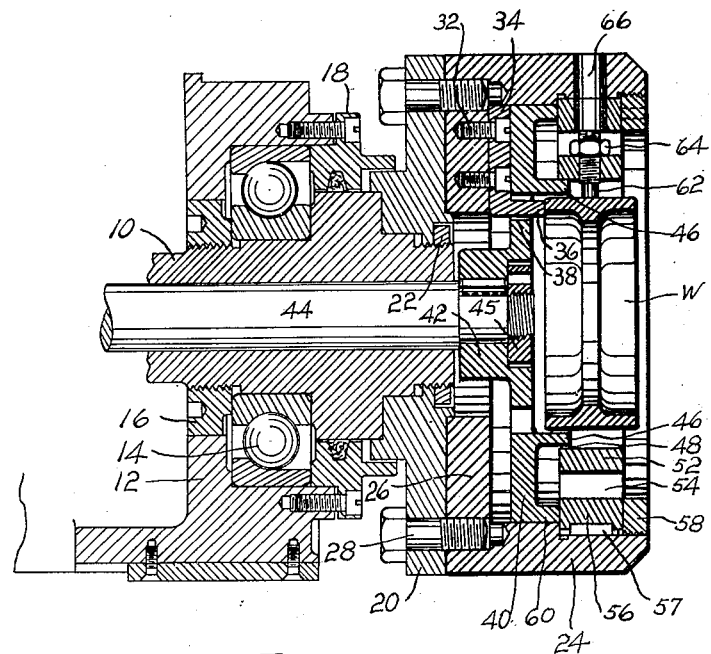
Figure 2:
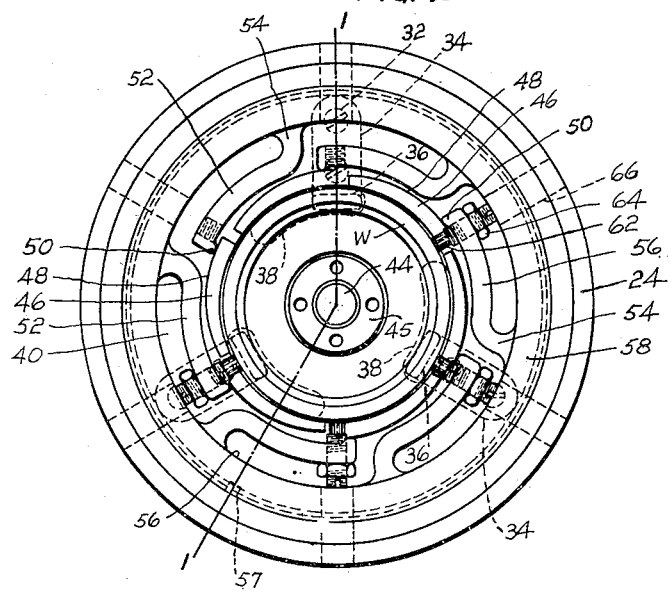
Fig. 2 is an end view.

The numeral 10 indicates a hollow work spindle journalled in a head 12 by ball bearings 14 and rotatably driven in any suitable manner. The inner race ring of the bearing is clamped on the spindle by a nut 16 and the outer race ring is clamped in the head by a flanged, sealing ring 18. A plate 20 is threaded on the outer end of the spindle and clamped by a nut 22. A substantially cup-shaped chuck carrying member 24 having a bottom wall 26 is secured against a flat face of the plate 20 by machine screws 28. In the member 24, against the bottom wall or ring 26 which serves as an abutment carrier are secured, by screws 32, a plurality of radial plates 34 having axially projecting fingers 36 (preferably three) whose ends form abutments for locating the end of a piece of work W to be ground. In the present instance, the work is shown as a double-row bearing, outer race ring externally supported for internal grinding. The fingers 36 project through circumferentially elongated slots 38 in a cam ring 40 whose hub 42 is keyed to the reduced end of a shaft 44 and clamped by a nut 45. The shaft normally rotates with the hollow spindle 10 but is rockably journalled therein for angular movement through a small arc under control of any suitable operating means (not shown).

When holding work externally, the cam ring 40 has a series of axially projecting portions 46 which partly surround the work-piece W and are provided externally with cam faces 48. The cams bear externally against little projections 50 on the free ends of circumferentially extending clamping arms 52 which have integral radial portions projecting inwardly at 54 from a chuck ring 56. The arms 52 are thus arranged in spaced relation to one peripheral face of the chuck ring and are entirely within the plane of the ring. The chuck ring 56 is secured by a key 57 to the member 24 and is clamped against a shoulder in the member 24 by a ring nut 58. The chuck ring 56 engages and guides a flange 60 on the cam ring 40 but leaves the latter free for limiting turning movement. Radially arranged screws 62 engage the exterior surface of the work-piece, being threaded in the spring arms 52 where they are clamped by nuts 64 in an adjusted position to center the work piece in the chuck. The screws are accessible for adjustment through radial holes 66 in the member 24 and in chuck ring 56 and are ground concentric with the chuck center. The spring arms preferably have an inherent tendency to move in towards the center to grip the work yieldingly but, upon a rocking of the shaft 44 relatively to the hollow spindle 10, the cams 48 will move the arms outwardly for release of the work-piece and insertion of another. If desired, the arms may be given an inherent tendency to spring out and the cams may be arranged to force them in. When a narrower work-piece is to be ground, another set of pates 34 with longer abutment fingers 36 may be substituted so that the middle of the narrow piece will be engaged by the screws 62.

In the modified construction shown in Figs. 3, 4 and 5, for a chuck open at both ends to permit simultaneous grinding of two raceways on the work-piece W, a frame 68 carries a supporting yoke or ring 70 having end plates 72 fastened by screws. The end plates are provided with race surfaces for ball bearings 74 which rotatably support a driven chuck carrying member 76. The bearings are shielded at each side by inner sealing rings 78 and by a pair of outer sealing rings 79 and 80 secured to the end plates by screws 81. Each outer sealing ring 80 has an inwardly and laterally projecting guard flange 82 entering a space 84 between outwardly and laterally projecting guard flanges on end plates 86 and 87.

which rotate with the driven member 76. The driven member 76 is connected by a key 88 to a pulley 90 having a driving belt 92.

Connected by a key 93 to the driven member 76 are two chuck rings 94 and 96 held together by screws 97, such screws also holding the end plate 86. The other end plate 87 projects within the driven member 76 and is threaded on a flange 98 projecting axially from the chuck ring 94. The other chuck ring 96 has a relieved portion 100 at one side and has radial slots cut into its thicker portion to receive abutment fingers 102 in the form of flat keys detachably secured by screws in the slots and projecting beyond the relieved portion to engage one end of the work-piece. Substituting thicker fingers or keys provides for narrower work-pieces. Mounted for turning movement in a recess of the chuck ring 96 is a cam ring 104 which can be clamped in angularly adjusted position by a nut 106. The cam ring 104 has a series of axially projecting portions 108 surrounding the periphery of the work and provided with external cam faces 110. The cam faces are arranged to engage little projections 112 on the ends of circumferentially elongated spring arms 114 which project inwardly at 116 from the chuck ring 94. Screws 118 are adjustably held by nuts 120 to the ends of the spring arms and project radially to engage and center the work-piece in the chuck. The screws are accessible through holes 122 in the chuck ring 94. Upon loosening the clamping nut 106, the cam ring 104 can be turned angularly by applying a suitable spanner tool to side notches 124 thereby causing the cam faces 110 to spread out the spring arms 114 to release the work-piece. Upon removing the work and turning the cam ring 104 in the opposite direction, the spring arms are allowed to contract to grip a new work-piece. The spring fingers are preferably six in number and they locate and clamp the work in one motion. They tend to free themselves of any grit and the spaces between the cam projections 108 facilitates this action. When the spring arms are integral with the chuck ring, wearing parts are reduced to a minimum. The ends of the work engaging screws 118 can be conveniently ground concentric while in the chuck.

I claim:

1. In a device of the character described, a chuck ring having a plurality of clamping arms extending circumferentially of one of its peripheral faces and in spaced relation to said face, work engaging members secured to the arms and projecting radially away from the peripheral face, in the plane of the arms and of said face, a cam ring mounted for relative turning movement with respect to the chuck ring, and a plurality of cam surfaces on said cam ring to control the clamping movement of the arms; substantially as described.

2. In a device of the character described, a chuck ring having a plurality of clamping arms integrally united thereto and extending circumferentially in spaced relation to a peripheral face of the ring, work-engaging members secured to the arms and projecting therefrom radially away from the peripheral face of the ring to lie free from contact with the ring, an abutment member at one side of the arms to locate one end of a work piece, and means for moving said clamping arms towards or from the center of the ring; substantially as described.

3. In a device of the character described, a chuck ring having a plurality of clamping arms extending circumferentially in spaced relation to a peripheral face of the ring, a cam ring mounted for turning movement with respect to the chuck ring, a plurality of projections extending axially from the cam ring into the plane of the clamping arms, and a cam surface on each projection and arranged to move one of the clamping arms towards or from the center of the chuck ring; substantially as described.

4. In a device of the character described, a chuck ring having a plurality of spring clamping arms, each arm comprising a portion extending radially from the ring and a free portion extending circumferentially in spaced relation to a peripheral face of the ring, and means for moving the free portions of the arms towards or from the center of the ring; substantially as described.

5. In a device of the character described, a chuck ring having a plurality of spring clamping arms, each arm comprising a portion extending radially from the ring and a free portion extending circumferentially in spaced relation to a peripheral face of the ring, screw pins adjustably carried by the free portion of the arms, and cams for moving the free portions of the arms towards or from the center of the ring; substantially as described.

6. In a device of the character described, a chuck carrying member, means for supporting the member for rotation, a chuck ring keyed to said member and having a plurality of clamping arms projecting circumferentially of the ring, each arm being connected at one of its end to the ring, means at one side of the clamping arms to engage one end of a work-piece, and cams for moving said arms with respect to the center of the chuck to grip or release a peripheral wall of the work-piece; substantially as described.

7. In a device of the character described, a chuck carrying member, means for supporting the member for rotation, a chuck ring keyed to said member and having a plurality of clamping arms, abutment fingers projecting towards said arms and removably carried by the chuck carrying member, and cams for moving the arms with respect to the center of the chuck; substantially as described.

8. In a device of the character described, a chuck carrying member, means for supporting the member for rotation, a chuck ring keyed to said member and having a plurality of clamping arms, an abutment carrier at one side of the chuck ring, abutment fingers removably mounted on said abutment carrier, a cam ring mounted for turning movement with respect to the chuck ring, and cams projecting from the cam ring for engagement with the clamping arms; substantially as described.

9. In a device of the character described, a chuck ring having a plurality of spring clamping arms integrally united therewith and arranged in the plane of the ring, work-engaging members on the arms and projecting radially therefrom away from the chuck ring, the arms having an inherent tendency to spring in one direction radially of the ring, and a plurality of cams for forcing the arms in the other direction; substantially as described.

10. In a device of the character described, a chuck ring having a plurality of clamping arms extending circumferentially in spaced relation to a peripheral face of the ring, a cam ring mounted for turning movement in a recess at one side of the ring, projections extending axially from the cam ring and entering between the chuck ring and a work-piece, and cams on the projections and engaging the arms; substantially as described.

11. In a device of the character described, a chuck ring, means outside of the ring for supporting and rotating the ring with both ends of the ring exposed, the chuck ring having a plurality of clamping fingers projecting from its inner periphery to engage the outer periphery of a work-piece, a cam ring carried by the chuck ring and mounted for turning movement, and projections extending between the work-piece and the chuck ring and having cams engaging the arms; substantially as described.

12. In a device of the character described, a chuck ring having a plurality of clamping arms extending therefrom, an abutment carrying member secured to one side of the chuck ring, a cam ring mounted to turn at the other side of the chuck ring and having cams engaging the arms, and means for clamping the cam ring to the chuck ring; substantially as described.

13. In a device of the character described, a chuck ring having a plurality of clamping arms extending therefrom, an abutment carrying member at one side of the chuck ring, a cam ring mounted for turning movement between the chuck ring and the abutment carrying member, the cam ring having openings, means for turning the cam ring, and abutment fingers projecting from said abutment carrying member through the openings in the cam ring; substantially as described.

14. In a device of the character described, a chuck ring having a plurality of spring arms integrally united therewith and projecting radially and circumferentially therefrom in the plane of the ring, work-engaging members rigidly secured to the arms and being free from contact with the ring, and a plurality of cams engaging said spring arms for controlling movement thereof towards or from the chuck ring; substantially as described.

15. In a device of the character described, a chuck ring having a plurality of clamping arms extending circumferentially thereof in the plane of the ring, work-engaging members carried by the arms and arranged in the plane thereof to provide for holding a work-piece in the plane of the arms, a cam ring mounted to turn at one side of the chuck ring, and cams projecting axially from the cam ring into the plane of the chuck ring and engaging the clamping arms at one side of the work engaging members; substantially as described.

16. In a device of the character described, a chuck ring having a plurality of spring arms extending circumferentially thereof in the plane of the ring, work engaging members carried by the arms and projecting radially away from the arm and from the chuck ring to be free from contact with the chuck ring, and a plurality of cams projecting axially into the plane of the chuck ring and engaging the arms; substantially as described.

17. In a device of the character described, a chuck ring having a plurality of clamping arms extending circumferentially in spaced relation to a peripheral face of the ring, a cam ring mounted to turn at one side of the chuck ring, and cams projecting axially from the cam ring and each engaging one of the clamping arms at the work-gripping end of the arm; substantially as described.

18. In a device of the character described, a chuck ring having a plurality of spring clamping arms, each arm comprising a portion extending away from the ring and a free portion extending circumferentially in spaced relation to a peripheral face of the ring, and cams projecting into the plane of the clamping arms and movable circumferentially to force said arms towards the chuck ring; substantially as described.

HAROLD DRAPER.